United States Patent
Usuba et al.

(10) Patent No.: US 8,472,433 B2
(45) Date of Patent: Jun. 25, 2013

(54) VOICE COMMUNICATIONS SYSTEM

(75) Inventors: Shinji Usuba, Tokyo (JP); Hiroshi Kuboki, Kanagawa (JP); Hiromi Aoyagi, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 342 days.

(21) Appl. No.: 12/662,380

(22) Filed: Apr. 14, 2010

(65) Prior Publication Data

US 2010/0202443 A1  Aug. 12, 2010

Related U.S. Application Data

(63) Continuation of application No. 11/165,433, filed on Jun. 24, 2005, now Pat. No. 7,733,849, which is a continuation of application No. PCT/JP03/16699, filed on Dec. 25, 2003.

(30) Foreign Application Priority Data

Dec. 26, 2002 (JP) ................................ 2002-377165
Feb. 28, 2003 (JP) .................................. 2003-52957

(51) Int. Cl.
  *H04L 12/66* (2006.01)
(52) U.S. Cl.
  USPC ........................................................ 370/352
(58) Field of Classification Search
  None
  See application file for complete search history.

(56) References Cited

U.S. PATENT DOCUMENTS

| | | | |
|---|---|---|---|
| 6,141,341 A | 10/2000 | Jones et al. | 370/352 |
| 6,173,044 B1 * | 1/2001 | Hortensius et al. | 379/93.09 |
| 6,445,695 B1 | 9/2002 | Christie, IV | |
| 6,748,078 B1 | 6/2004 | Posthuma | |
| 6,876,648 B1 | 4/2005 | Lee | 370/353 |
| 2001/0012287 A1 | 8/2001 | Miyazaki et al. | 370/352 |
| 2001/0024436 A1 | 9/2001 | Barraclough et al. | |
| 2002/0007273 A1 | 1/2002 | Chen | 704/229 |
| 2002/0101854 A1 | 8/2002 | Siegrist et al. | 370/352 |
| 2003/0118176 A1 * | 6/2003 | Tokuda et al. | 379/390.01 |

FOREIGN PATENT DOCUMENTS

| | | |
|---|---|---|
| CN | 1234712 A | 11/1999 |
| EP | 0 952 746 A2 | 10/1999 |
| EP | 0 952746 A2 | 10/1999 |
| EP | 1191753 A2 | 3/2002 |
| JP | 11-331371 A | 11/1999 |
| JP | 11-331371 A | 11/1999 |
| JP | 2000-201218 | 7/2000 |
| JP | 2000-201218 A | 7/2000 |
| KR | 10-0368114 | 1/2003 |
| WO | WO-01/71994 | 9/2001 |
| WO | WO-01/71994 A1 | 9/2001 |

* cited by examiner

*Primary Examiner* — Otis L Thompson, Jr.
(74) *Attorney, Agent, or Firm* — Rabin & Berdo, P.C.

(57) ABSTRACT

Voice communications apparatus is connected to a general subscriber telephone set or a broadband telephone set, to communicate over the public switched telephone network. The apparatus includes a filter converting signals such as to satisfy signal conditions prescribed for the telephone network. The apparatus also includes a terminal class determiner for determining the class of the telephone set connected, and a circuit for changing at least the sampling frequency at which the analog signals from the telephone set are sampled. This establishes high quality in broadband voice communications. The terminal class determiner may automatically determine the class of the telephone set at any timing of a call sequence by detecting a band component of the signals from the telephone set, a predetermined frequency of a signal intermittently transmitted from the telephone set or the characteristics of the telephone set.

23 Claims, 9 Drawing Sheets

*Fig. 4A*
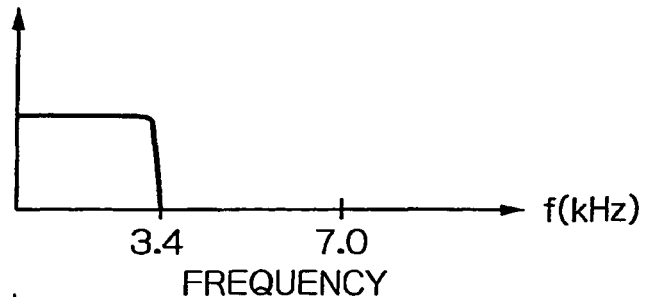
*Fig. 4B*
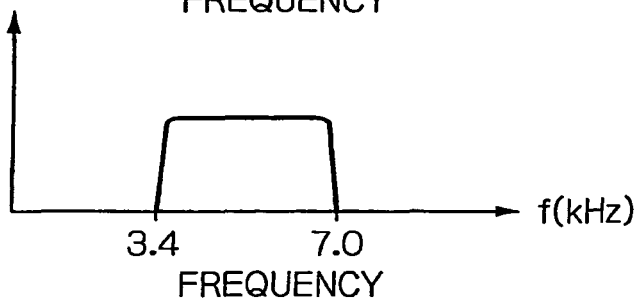
*Fig. 4C*
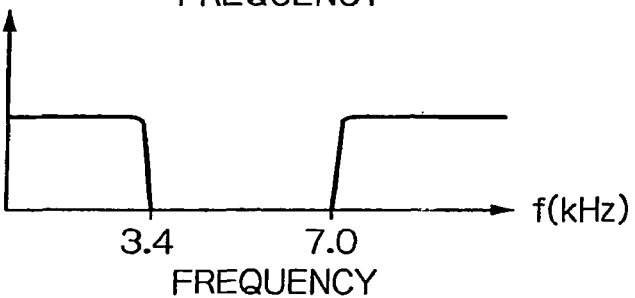
*Fig. 5*
| X | Y | Z | DETERMINED CLASS |
|---|---|---|------------------|
| 1 | 1 | 1 | AUDIO BAND |
| 1 | 1 | 0 | BROADBAND |
| 1 | 0 | 1 | AUDIO BAND |
| 1 | 0 | 0 | NARROW BAND |
| 0 | 1 | 1 | NARROW BAND |
| 0 | 1 | 0 | NARROW BAND |
| 0 | 0 | 1 | NARROW BAND |
| 0 | 0 | 0 | NARROW BAND |

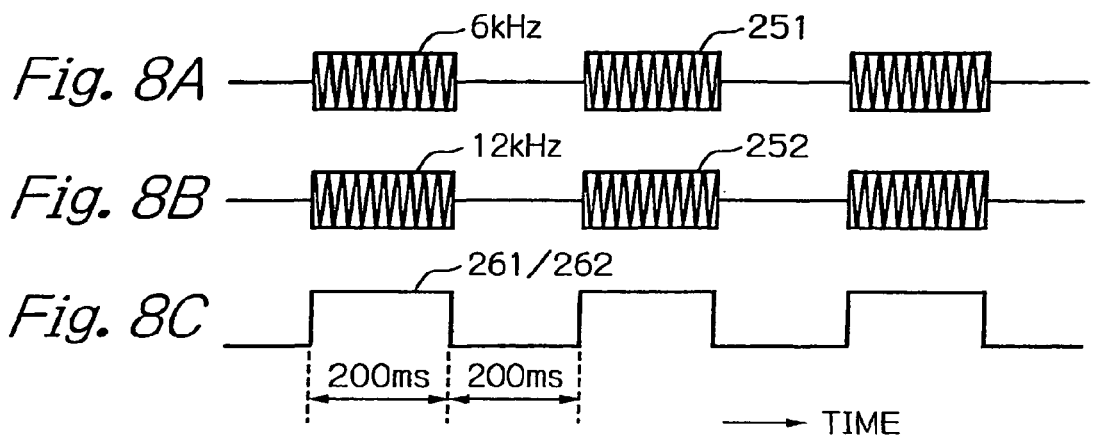
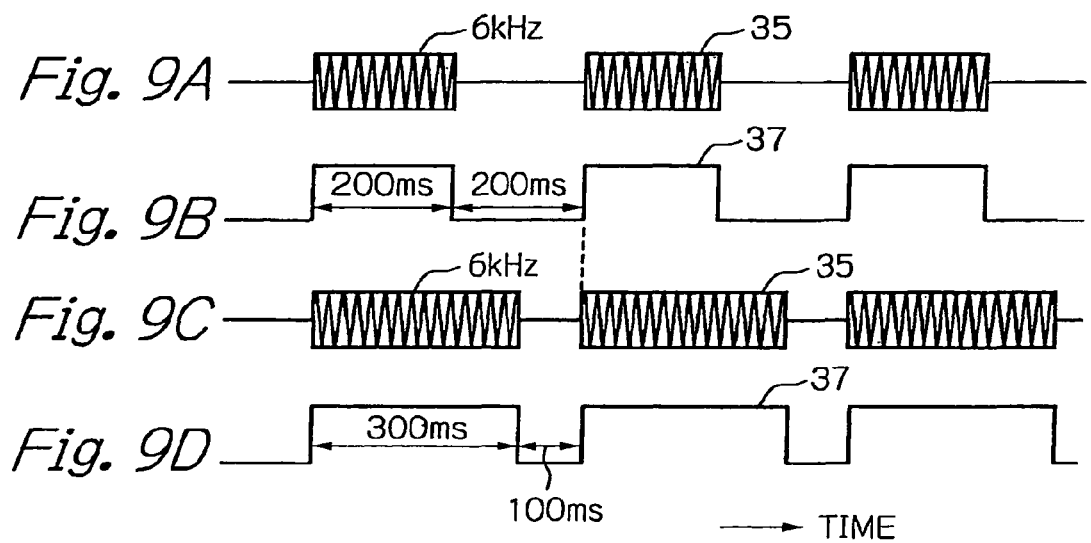

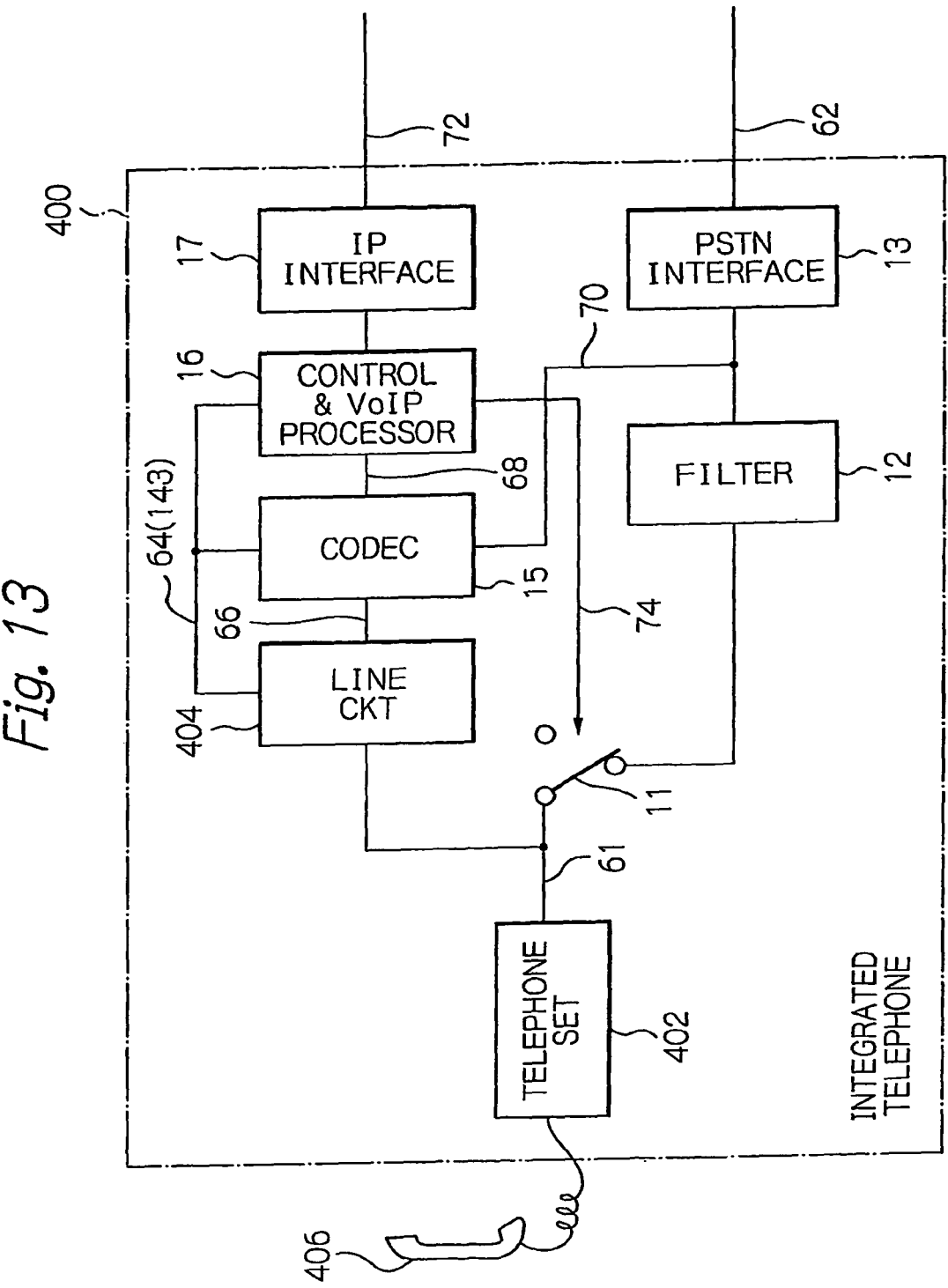

VOICE COMMUNICATIONS SYSTEM

This application is a continuation application of co-pending application Ser. No. 11/165,433, filed on Jun. 24, 2005, and claims the benefit of Japanese application Serial No. 2003-52957, filed Feb. 28, 2003, and Japanese application Serial No. 2002-377165, filed Dec. 26, 2002, the subject matters of which are incorporated herein by reference.

BACKGROUND OF THE INVENTION

1. Field of the Invention

The present invention relates to a voice communications system adaptive for broadband communications, and more particularly to gateway apparatus capable of communicating from a telephone set selectively with an Internet Protocol (IP) network or to a public switched telephone network (PSTN).

2. Description of the Background Art

The Voice over IP (VoIP) technique has recently come into widespread use due to the lower network or communication cost established by assembling voice signals into IP packets to thereby integrate voice with data. On the one hand, the traditional public switched telephone network (PSTN) attaches importance to however voice signals are to be transmitted, and transmission band is limited to 3.1 kHz or less. The network design architecture restricts the bandwidth for a unit channel to 3.1 kHz, while digital transmission networks have a basic transmission rate of 64 Kb/s with the sampling rate of 8 KHz. This means that both the terminals and the networks have handled signal frequencies exceeding 3.1 kHz as unnecessary signals.

On the other hand, with recent tendency towards broadband services, the transmission equipment on the networks is designed to cope with broadband communications. Moreover, even the central office lines are being adapted to broadband networks by means of asymmetrical digital central office lines (ADSL) or optical transmission lines, such that end-to-end broadband voice transmissions have become available. As a result, high-quality voice communications have become a desideratum.

However, gateway equipment and telephone subscriber sets compatible with the VoIP technology, which recently have become popular, merely attaches importance to coping with VoIP, but have been unable to realize high-quality voice communications which have exploited the advantages of the broadband networks. Although the broadband telephone set, which widens the frequency band of the voice signals, has been proposed, this type of the telephone set, if connected to the public switched telephone network, violates its technical conditions.

In an application where the general subscriber telephone sets, dedicated to the public switched telephone network, are connected over a gateway unit to the broadband transmission channel, if in-channel signals, such as voice signals, transmitted between the general subscriber telephone sets and the gateway unit are subjected to signal conversion for coping with broadband communications, it would be difficult to provide for sufficient speech quality because of the natures specific to the general subscriber telephone sets.

Moreover, when designing a certain telephone set, it is neither definite whether the telephone set will be connected to the public switched telephone network or to the IP network nor whether the telephone set will be connected directly or via a gateway unit to the network. Even a telephone set designed to cope with high-quality or wide-band transmission, when interconnected to the system, such as a gateway unit, would often prevent signals from being transmitted appropriately.

Although it may be contemplated to correct the characteristics of a telephone set, when installed in the system, it is not definite which conditions are to be used for the correction, and it may be feared that the telephone set, even when corrected, fails to achieve its optimum performance. Although it may also be contemplated to compensate for the characteristics of the telephone set by the function of the gateway unit, to which is connected the telephone set, it is not possible to sufficiently compensate for some of the characteristics, such as acoustic ones, of the telephone set that cannot be comprehended from the gateway unit.

In light of the above, such a system has been desired which exploits the features of the broadband network to achieve high-quality broadband voice communications, or which is able to cope with voice communications over the public switched telephone network while coping with the broadband technique.

SUMMARY OF THE INVENTION

It is an object of the present invention to provide a voice communications system which is able to realize high-quality broadband voice communications and to cope with voice communications via a public switched telephone network, and a telephone set used therefor.

In accordance with the present invention, voice communications apparatus includes a port connectable to either of a general subscriber telephone set and a broadband telephone set. The apparatus is interposed in communication between the telephone set connected and a public switched telephone network. The apparatus comprises a filter for converting a signal transmitted and received for the telephone set so that the signal satisfies a signal condition prescribed in the public switched telephone network.

Preferably, the voice communication apparatus according to the present invention comprises a circuit for determining a class of the telephone set connected, and a circuit for changing at least a sampling frequency in sampling an analog signal from the telephone set, depending on the class of the telephone set determined.

In an aspect of the invention, voice communications apparatus may comprise a telephone circuit for setting up a call selectively over either of a broadband network and a public switched telephone network, and a filter for converting a signal transmitted and received for the telephone circuit so that the signal satisfies a signal condition prescribed in the public switched telephone network.

In another aspect of the invention, voice communications apparatus may comprise a telephone circuit for setting up a call selectively over either of a broadband network and a public switched telephone network, a first circuit for determining over which of the broadband network and the public switched telephone network a call is to be established, and a second circuit for changing at least a sampling frequency in sampling an analog signal from the telephone circuit, depending on a determination made by the first circuit.

In accordance with the invention, a telephone set according to the present invention connectable to a network including at least one of a public switched telephone network and a broadband communications network comprises a determining circuit for receiving from the network a signal by which a sort of the at least one network can be determined and determining which of the public switched telephone network and the broadband communications network the network is, and a selector circuit responsive to a result from the determining circuit for selecting a communication band at least toward the network.

Further in accordance with the invention, a voice communications system comprises either of a general subscriber telephone set and a broadband telephone set, and voice communications apparatus interposed in communication between the telephone set comprised and at least one of a public switched telephone network and a broadband communications network. The voice communications apparatus includes a circuit for sending out to the telephone set a signal by which a sort of the at least one network can be determined. The telephone set includes a determining circuit for receiving the sent-out signal for determining which of the public switched telephone network and the broadband communications network the at least one network is, based on the received signal, and a selector circuit responsive to a result from the determining circuit for selecting a communication band at least toward the network.

Alternatively, the voice communications apparatus may include a first circuit for determining a class of the telephone set comprised, and a second circuit operative in response to the class determined for changing a property of an in-channel signal transmitted between the telephone set comprised and the voice communications apparatus.

Further alternatively, the voice communication apparatus may include a first circuit for determining a class of the comprised telephone set connected, and a second circuit for providing the comprised telephone set with a change command for changing characteristics corresponding to the class determined, the comprised telephone set including a third circuit responsive to the change command for changing a property of an in-channel signal transmitted between the voice communications apparatus and the telephone set comprised.

Telephone set accommodating apparatus according to the present invention for accommodating either of telephone sets which are different from each other in effective band of transmission comprises a first circuit for determining a class of the accommodated telephone set at a timing in a call sequence.

Preferably, the first circuit may comprise a frequency band separator for separating a frequency band of a signal from the accommodated telephone set into a plurality of sub-bands, a signal detector for detecting whether or not an effective signal component is included in the sub-bands, and a second circuit for using a result from detection of the signal detector to determine the class of the telephone set accommodated.

Also preferably, the first circuit may include a pattern detector for detecting a pattern of a signal intermittently incoming at a predetermined frequency, and a second circuit for using either of a detection of the pattern by the pattern detector, a content of the pattern detected and the predetermined frequency of the signal to determine the class of the telephone set accommodated.

Alternatively, the first circuit may include a measurement circuit for measuring either of impedance toward the telephone set accommodated, interline voltage of the telephone set accommodated and blocking current of the telephone set accommodated, and a second circuit for using a result from measurement by the measurement circuit to determine the class of the telephone set accommodated.

The telephone set comprises a pattern generator for generating a first signal having an intermittent pattern, a frequency signal generator for intermittently generating a second signal of a predetermined frequency in response to the intermittent pattern of the first signal, and an adder circuit for adding the second signal on a speech signal channel, the pattern generator, the frequency generator and the adder circuit operating at a predetermined stage in a call sequence.

Alternatively, the telephone set may comprise a pair of lines connectable to telephone set accommodating apparatus for accommodating the telephone set, and a circuit for operating either of impedance of the telephone set looking from the apparatus, interline voltage across the pair of lines connected to the apparatus and blocking current of the telephone set, the circuit being operative at a predetermined stage in a call sequence.

BRIEF DESCRIPTION OF THE DRAWINGS

The objects and features of the present invention will become more apparent from consideration of the following detailed description taken in conjunction with the accompanying drawings in which:

FIGS. 4A, 4B and 4C plot the pass-band characteristics of the band separator filters included in the terminal class determining unit shown in FIG. 3;

FIG. 5 illustrates the decision logic of the terminal class determining unit in the embodiment of FIG. 3;

FIGS. 8A, 8B and 8C are timing charts showing waveforms appearing in various portions of the embodiment shown in FIG. 7;

FIGS. 9A to 9D are timing charts showing waveforms appearing in various portions of the telephone set of the other alternative embodiment;

FIG. 13 show in a schematic block diagram a still further embodiment of the telephone set in accordance with the invention.

DESCRIPTION OF THE PREFERRED EMBODIMENTS

Figure 1:
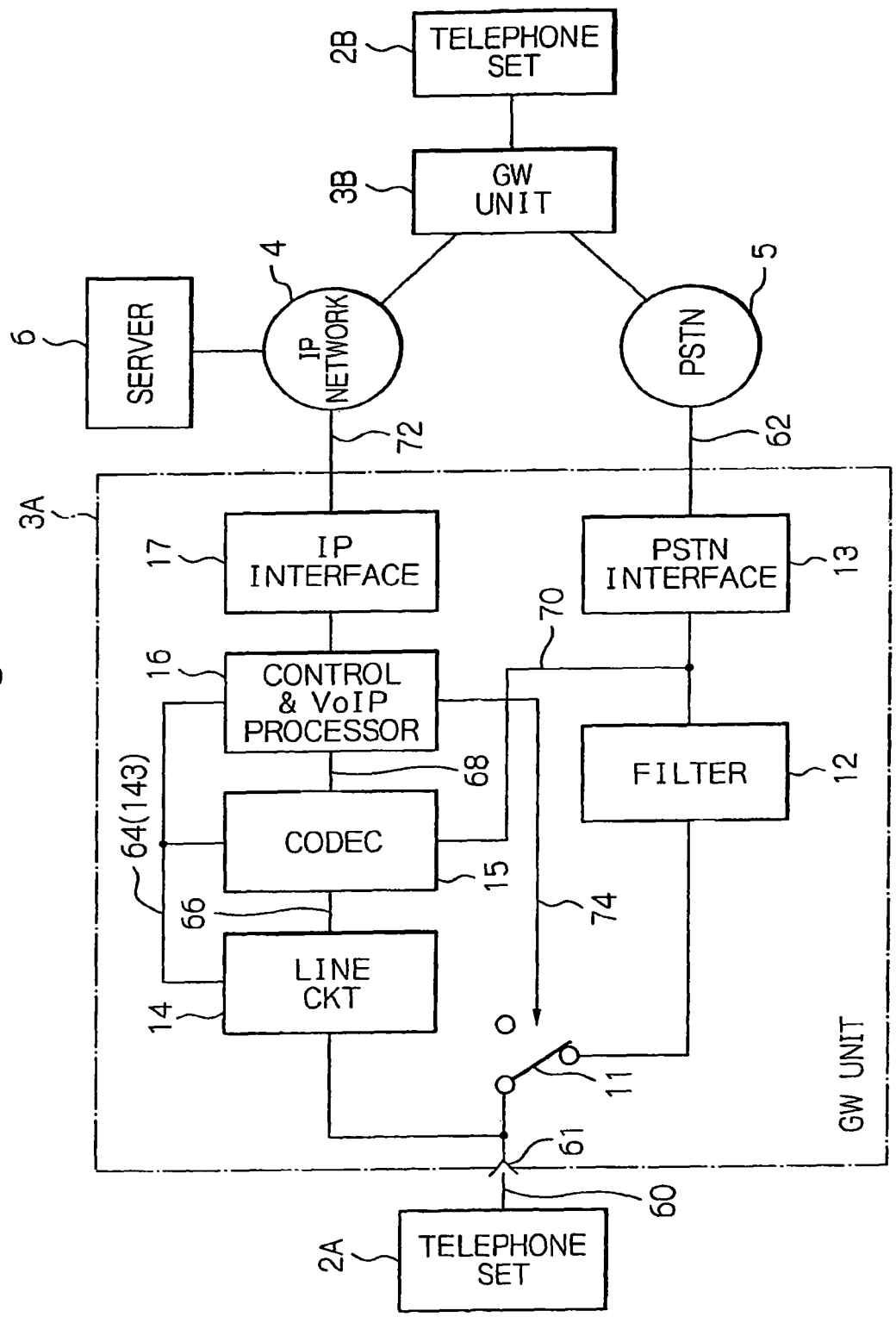
FIG. 1 is a schematic block diagram showing a preferred embodiment of a voice communications system according to the present invention.

Now with reference to the accompanying drawings, preferred embodiments of the present invention will be described in detail. Referring to FIG. 1, a voice communications system 1 of the present embodiment comprises gateway (GW) units 3A and 3B, to which telephone subscriber sets 2A and 2B are interconnected, respectively, and which are interconnected to a broadband network, such as an IP network, 4 and to a public switched telephone network (PSTN) 5. The telephone sets 2A and 2B are thus capable of voice communication over the IP network 4 or the public switched telephone network 5. In general, a large number of gateway units and telephone sets are accommodated in the IP network 4 and in the public switched telephone network 5. However, FIG. 1 shows only two sets of the gateway units and telephone sets for simplicity of the illustration.

Where the network operates as the voice communications system, one of the telephone sets, for example 2B, may be a broadband telephone terminal set compatible with VoIP. In that case, the telephone set 2B may be interconnected not to the gateway unit 3B but directly to the IP network 4. The telephone set may also be a general subscriber telephone set, in which case the telephone set may be interconnected not to the gateway unit 3B but directly to the public switched telephone network 5.

The other telephone set 2A, connected to the gateway unit 3A, may, in the present embodiment, be a broadband telephone set, or a general subscriber telephone set. In the present embodiment, this telephone set is connected by an analog line 60 to the gateway unit 3A through a connector 61, which may generally be detachable.

The gateway unit 3A functions as a telephone set connecting device, and, with the instant embodiment, is selectively interconnected to the IP network 4 or the public switched telephone network 5 to establish the communication with the telephone set 2A connected thereto.

The gateway unit 3A includes a bypass switch 11, a filter unit 12, a PSTN interface 13, a central office line circuit 14, a codec unit 15, a control and VoIP processor 16 and an IP network interface 17, which are interconnected as shown. The gateway unit 3B may be configured similarly to the gateway unit 3A. In the following description, the parts or components not directly relevant to the understanding of the present invention are neither described nor illustrated in the drawings.

The bypass switch 11 is connected to a central office line 60 of the telephone set 2A. As indicated by a control line 74, when the telephone set 2A communicates over the public switched telephone network 5, the bypass switch is switched to connect the telephone set 2A to the filter unit 12, under the control by the control and VoIP processor 16, as later described. In the standby state, the bypass switch 11 may be adapted to connect the filter unit 12, or alternatively adapted not to connect the filter unit 12.

The filter unit 12 is connected to the switch 11 and, in the illustrative embodiment, adapted to limit the band of the call signals to the public switched telephone network 5 to the voice band regulated by the public switched telephone network 5, without regard to whether the telephone set 2A is a broadband telephone set or a general subscriber telephone set. In the case the telephone set 2A is a general subscriber telephone set, the call signals from the telephone set 2A are already limited to the voice band, and hence the significance of the filter unit 12 is low. However, in the case the telephone set 2A is a broadband telephone set, the filter unit operates effectively. Alternatively, the filter unit 12 may be configured to operate only in the case the telephone set 2A is of a broadband type and not process line signals in the case the telephone set 2A is a general subscriber telephone set. The filter unit 12 may also be configured for filtering the call signals coming from the public switched telephone network 5 toward the telephone set 2A.

The PSTN interface 13 is connected to a central office line 62, connected to the public switched telephone network 5, for interfacing the public switched telephone network 5 with respect to the gateway unit 3A. In the case the telephone set 2A is of a broadband type, the PSTN interface 13 also plays the role of matching the line voltage and current to the prescriptions of the public switched telephone network 5.

The subscriber line circuit 14 is connected to a line 60 from the telephone set 2A for interfacing the telephone set 2A with the gateway unit 3A. The subscriber line circuit 14 may also be configured for directly imparting an off-hook detection signal and the telephone number of a called party received from the telephone set 3A to the control and VoIP processor 16, as indicated by a connection line 64. In the following description, signals are specified with the reference numeral of particular connections on which appear the signals.

The codec unit 15 has a signal converting function. More specifically, the codec circuit 15 is adapted to receive signals, such as a call control signal or a speech signal, from the subscriber line circuit 14 over a connection line 66 to convert the signals into corresponding digital signals, or to receive signals, such as a call control signal, incoming from the public switched telephone network 5 through the PSTN interface 13, to convert the signals into corresponding digital signals. The codec unit 15 also receives the call control signal or the speech signals to the telephone set 2A from the control and VoIP processor 16 over a connection line 68 to convert the signals into associated analog signals, which are then delivered to the subscriber line circuit 14. The codec unit 15 also converts the digital signals, such as a call control signal, from the control and VoIP processor 16 to the public switched telephone network 5, into corresponding analog signals, which are in turn sent out over a connection line 70 to the PSTN interface 13.

In the present embodiment, the codec unit 15 also has the function of changing the sampling frequency and/or the data transmission rate, depending on the sort, or terminal class, of the telephone set 2A which is in circuit, when the telephone set 2A communicates over the IP network 4.

For example, when the telephone set 2A is a general subscriber telephone set, the codec unit 15 applies 8 kHz as its sampling frequency. When the telephone set 2A is broadband one, having 7 kHz or less as the speech band, the codec unit applies 16 kHz as its sampling frequency. In the case the telephone set 2A is a broadband type and has its speech band of 20 kHz or less, the codec unit applies 44 kHz as its sampling frequency. When the gateway unit 3A has a processing system, such as a personal computer, connected over a LAN circuit, the codec unit 15 may be adapted to apply 44 kHz as its sampling frequency, and selectively set either 8 kHz or 16 kHz, depending on the class or kind of the telephone set 2A.

The control and VoIP processor 16, comprised e.g. of a one-chip processor, is adapted for controlling the overall operations of the gateway unit 3A, and performing the VoIP processing, such as assembling or disassembling IP packets. In the present embodiment, the codec unit 15 mainly takes charge of analog-to-digital (A/D) conversion or digital-to-analog (D/A) conversion, as described above. The control and VoIP processor 16 takes charge of encoding prior to assembling IP packets and decoding after disassembling IP packets.

The IP interface unit 17 is connected over a line 72 to the IP network 4 for interfacing therewith.

Well, for determining the terminal class of the telephone set 2A, connected to the gateway unit 3A, namely, whether the telephone set 2A is a broadband or a general subscriber telephone set, the present embodiment uses the following methods. The results of the determination are used for switching the sampling frequencies in the codec unit 15 and for determining whether or not the filtering is to be executed in the filter unit 12. The determination may be effected at a timing when the gateway unit 3A starts up, e.g. powered up, or when a call originates from the telephone set 2A off-hooking.

As an illustrative method, the gateway unit 3A may be provided with a couple of connectors 61 for separately connecting the broadband telephone set and the general subscriber telephone set. In that case, the control and VoIP processor 16 is adapted to detect to which one of the connectors the telephone set 2A has been connected to determine the class or type of the telephone set 2A. Alternatively, a single connector 61 to the telephone set 2A is provided to have a reciprocating pin, not shown, and the connection line 60 from the telephone set 2A has its plug, also not shown, provided which is adapted to allow the pin to be receded for a broadband telephone set coupled and not to be receded for a general subscriber telephone set coupled. The control and VoIP processor 16 detects which plug has been inserted into the connector 61, in response to the receding or not of the pin, to determine the class of the telephone set 2A.

As an alternative method, a manually operable switch, such as a dip switch, for indicating whether the telephone set 2A, connected in circuit, is a broadband or a general subscriber telephone set, may be provided to the gateway unit 3A. The control and VoIP processor 16 determines the class of the telephone set 2A, depending on the connection state of the manual switch.

As another alternative method, a measurement unit for measuring input physical properties on the connection line 60 to the telephone set 2A may be provided to the subscriber line circuit 14, the control and VoIP processor 16 then collating a measured value to internally stored information to check the class of the telephone set 2A. The physical properties available for the measurement may include a standby voltage, a interline voltage, a voltage to ground, speech current, the frequency or pattern of off-hook tone, a received pushbutton (PB) signal or a received dial-pulse (DP) signal.

Furthermore, a measurement unit for measuring output physical properties from the subscriber line circuit 14 to the telephone set 2A may be provided to the subscriber line circuit 14. The control and VoIP processor 16 may in this case be adapted to collate variations in the measured value or a response thereto to internally stored information to check the class of the telephone set 2A. The available output physical properties may, for example, be a ringer output voltage, a ringer output frequency, a ringer pattern, a sent-out PB signal, a sent-out tone for identification, a sent-out, high-frequency range tonal signal, or a transmitted/received modem signal. In sum, the physical properties may be used which are discriminable in reaction between a broadband and a general subscriber telephone set. Depending on the type of the physical properties, it may be necessary to set up a broadband telephone set so as to react differently from a general subscriber telephone set. The measurement of these physical properties will be discussed subsequently in detail.

In the above-described determination methods for the classes of the telephone set, or terminal class, a combination of those physical properties may be used for the determination. Such a combination of the plural physical properties may be of the input and output physical properties of the connection line 60.

The above-described determination methods, which are based on the measurement of the input physical properties, are directed to the control and VoIP processor 16 adapted to autonomously determine the class of the telephone set 2A. Alternatively, a database, having information stored on correspondence between measured values of the physical properties and the classes of the telephone set, may be provided on a server 6 of the IP network 4, the control and VoIP processor 16 being then adapted for imparting a measured value to the server 6, which in turn provides the control and VoIP processor 16 with the class information of the corresponding telephone set 2A. Instead of acquiring the class information of the telephone set 2A from the server 6, set data per se, which are used to change the properties, such as the sampling frequency, in the codec unit 15, may be acquired from the server 6. In the latter case, the sort, or terminal class, determination is carried out by the gateway unit 3A.

In operation, a calling party off-hooks on the telephone set 2A to dial the telephone number of a called telephone set, here the telephone set 2B, exploiting the public switched telephone network 5, the PB signal, indicating the telephone number of the called party, is sent out from the telephone set 2A and detected by a PB signal detector, not shown, of the subscriber line circuit 14. The control and VoIP processor 16 then determines that this is a connection requested to the public switched telephone network 5.

At this time, the control and VoIP processor 16 sets the bypass switch 11 to its connecting state to the filter unit 12, as shown. More specifically, if the bypass switch 11 is in its standby state to connect to the filter unit 12, it keeps this connecting state. If the bypass switch 11 is in its standby state not connecting to the filter unit 12, it is switched to its connecting state to the filter unit. At this time, the control and VoIP processor 16 disables its function unit for communicating with the IP network 4.

If the filter unit 12 is adapted for operating only in the case the telephone set 2A is of a broadband type, it takes its effective operative state, depending on the above-described results from determining the terminal class of the telephone set 2A. Under this condition, when the telephone set 2A is a broadband telephone set, line signals provided therefrom are received via the bypass switch 11 by the filter unit 12 and are limited to the frequency band allowed by the public switched telephone network 5 so as to be sent out through the PSTN interface 13 to the public switched telephone network 5.

When the telephone set 2A is a general subscriber telephone set, line signals provided therefrom pass the bypass switch 11, and thence are simply transmitted through the filter unit 12, or alternatively limited to the band allowed for the public switched telephone network 5 by the filter unit, 12, to be transmitted through the PSTN interface 13 to the public switched telephone network 5.

Speech signals, received by the PSTN interface 13 from the public switched telephone network 5, are filtered by the filter unit 12 and sent out via the bypass switch 11 to the telephone set 2A.

Now, when a calling party calls the called telephone set 2B, exploiting the IP network 4, he or she off-hooks the telephone set 2A to dial the telephone number of the called telephone set 2B. The PB signal, indicating the telephone number of the called party, is transmitted from the telephone set 2A and detected by the PB signal detector of the subscriber line circuit 14. The control and VoIP processor 16 determines this to be a call over the IP network 4. At this time, the control and VoIP processor 16 is responsive to the results from determining the terminal class of the telephone set 2A, i.e. whether the telephone set 2A is a general subscriber or a broadband telephone set, to set the sampling frequency or the data transmission rate for the codec unit 15. At the same time, the control and VoIP processor 16 sets or keeps the bypass switch 11 to its non-connecting state.

In this state, the speech signals, sent out from the telephone set 2A, are imparted via the subscriber line circuit 14 to the codec unit 15, which then converts the speech signals into corresponding digital signals at the set sampling frequency. The resulting digital signals are assembled by the control and VoIP processor 16 into an IP packet, which then is sent out via the IP interface 17 to the IP network 4.

Speech signals received from the IP network 4 arrive in the form of an IP packet, which is then processed in the codec unit 15 at the sampling frequency set depending on the class of the telephone set 2A.

When the gateway unit 3A has received a call from the public switched telephone network 5, the PSTN interface 13 produces a call control signal therefor to the codec unit 15, which in turn converts the signal into a corresponding digital signal at the sampling frequency in its standby state. The control and VoIP processor 16 recognizes the call incoming from the public switched telephone network 5. The control and VoIP processor 16 will then perform control operations similar to those in calling from the telephone set 2A to the IP network 4 described above.

A call incoming from the network 4 is recognized by the control and VoIP processor 16 in response to the IP interface 17 having received a signal, and proceeds to the control operations similar to those in call-originating from the telephone set 2A to the IP network 4 described above.

In the present embodiment as described above, if the telephone set 2A connected to the gateway unit 3A is a broadband telephone set, the filter unit 12 thus effects bandwidth limitations in accessing to the public switched telephone network 5. This allows the signals sent out from the gateway unit 3A to satisfy the technical conditions or requirements of the public switched telephone network 5. Even in the case the broadband telephone set 2A does not meet the other technical conditions, the signals are thus able to satisfy the technical conditions by means of the PSTN interface 13.

Moreover, in accessing the IP network 4, the sampling frequency of the codec unit 15 is controlled for being changeable depending on the type of the telephone set 2A connected in circuit. Thus, the communication over the IP network 4 can be established to the extent that information carried by speech signals is almost all available, thereby raising the speech quality.

The gateway unit 3A has the function of determining the kind, or terminal class, of the telephone set 2A connected in circuit thereto, thus effectively exhibiting the above-described functions.

Figure 2:
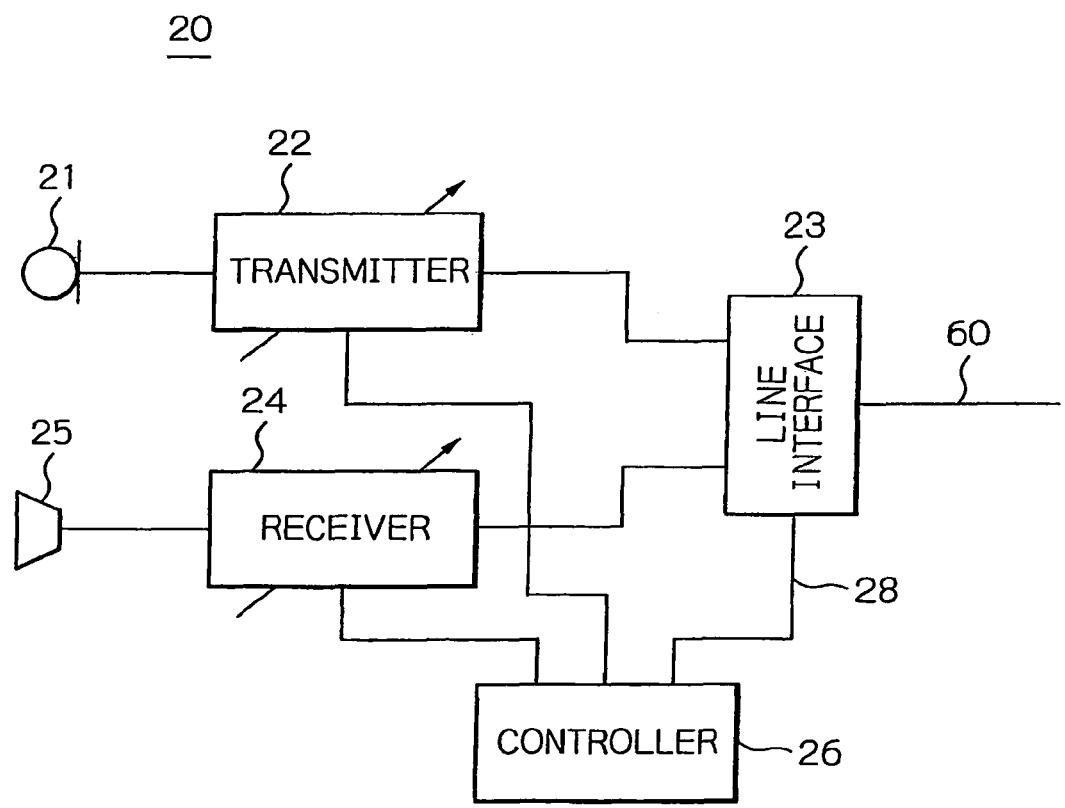
FIG. 2 is a schematic block diagram showing an illustrative embodiment of a telephone set for use in the embodiment shown in FIG. 1.

Referring to FIG. 2, an embodiment of the broadband telephone set is now described as an example of the telephone set 2A that can be connected mainly to the gateway unit 3A. A broadband telephone set 20 of the present embodiment may be directly coupled to the IP network 4 or to the public switched telephone network 5. The broadband telephone set 20 includes a microphone 21, a transmitter 22, a subscriber, or central office, line interface unit 23, a receiver 24, an earphone 25 and a controller 26, interconnected as shown.

The transmitter 22 has its speech band variable or selectable, and may comprise a variable filter, not shown. The transmitter 22 may be adapted to have its speech band switchable between an audio band having 200 kHz, a wide band mode having a 7.1 kHz and a narrow band mode having 3.1 kHz. The wide band mode is the standby mode of the filter.

The receiver 24 is a receiving circuit having a variable receiving band which may be switched between the audio band mode, the wide band mode and the narrow band mode. The wide band mode is the standby mode of the receiver 24.

The subscriber line interface 23 is connected to a subscriber or central office line 60 and includes a detection unit, not shown, for detecting a mode switching trigger signal transmitted over the subscriber line 60 from the network side. Upon detection of the trigger signal by the detector, the subscriber line interface 23 sends results of detection 28 to the controller 26.

By means of the mode switching trigger signal available from the network, the audio mode, the wide band mode or the narrow mode may be specified, respectively, in dependence upon the signal of a frequency falling in a range from 20 kHz to 7.1 kHz or its signal pattern, the signal of a frequency falling in a range from 7.1 kHz to 3.1 kHz or its signal pattern, or the signal of a frequency falling in a range from 3.1 kHz to 0 kHz or its signal pattern. With the use of this trigger signal, it is possible to cope even with such a case in which the broadband telephone set 20 is directly interconnected to the IP network 4 or to the public switched telephone network 5.

As the mode switching trigger signal available from the network, use may be made of signals different in property between the public switched telephone network 5 and the IP network 4, such as interline voltage during call, voltage to ground, ringer voltage, PB signal or the modem signal.

The controller 26 is adapted for controlling the broadband telephone set 20 in its entirety, and performing not only the control generally required for a telephone subscriber set but also the variable control on the transmitting band of the transmitter 22 and the receiving band of the telephone receiver 24 in response to the result from a detection by the detector function of the line interface unit 23.

The gateway unit 3A may be configured for generating the aforementioned mode switching trigger signal for itself and for outputting the so-generated signal. Alternatively, the mode switching trigger signal, incoming from the public switched telephone network 5 or the IP network 4, may be sent directly to the broadband telephone set 20. For example, if the control and VoIP processor 16, FIG. 1, is unable to determine the class of the telephone set 2A, the gateway unit 3A may be adapted to generate, for itself, the mode switching trigger signal by for example the subscriber line circuit 14 to output the so-generated signal to the subscriber line 60.

The broadband telephone set 20 of the present embodiment, described above, controls over the transmission band and the receiving band depending on the type of the network used for transmission, so that the voice communications of high quality may be realized without dependency on the network type.

In the above-described embodiment, the gateway unit 3A is configured for variably setting the sampling frequency and whether or not signals are to be filtered, depending on the type of the telephone set 2A connected in circuit. However, instead of using this configuration, the system may be adapted for varying the in-channel signals transmitted between the gateway unit and the telephone set. For example, a variety of characteristics or properties, such as the voltage or pattern of PB signals, ringer signals, tonal signals or modem signals, interline voltage or the voltage to ground, may be changed. It is sufficient to provide generator devices for generating ringer signals, tonal signals or modem signals specific for the type or class of the telephone sets, i.e. terminal class. Additionally, in an application in which the gateway unit includes an echo canceller, initial coefficients of the adaptive operations at the time of commencing a call may be adapted for depending on the class of the telephone set.

Data of variations in the above-described properties or physical properties, adaptively changeable with the sort, or terminal class, of telephone sets, may be stored in the database of the server 6 on the IP network 4, and the gateway unit 3A may provide the server 6 with the class of a telephone set to receive a variation to set the variation to a variable element.

In the above-described embodiment, the characteristics or properties changeable in the broadband telephone set 20 depending on the mode switching trigger signal obtained from the network side are speech transmitting and/or receiving characteristics. Alternatively, the system may be adapted so that only the speech transmission characteristics are changeable, or other characteristics or physical quantities may be changeable. The system may be adapted so that other characteristics, such as voltages of the PB signals, tonal signals or modem signals, interline voltage or the voltage to ground during a call, are changeable.

The telephone subscriber set may be adapted to respond to a change command from the gateway unit side to change the characteristics of the in-channel signals transmitted between a voice communications device and the telephone set.

The gateway unit 3A may also be adapted to collate the results from a measurement made by a measuring unit in the subscriber line circuit 14 to information stored in the control and VoIP processor 16 to obtain a change command, as will be described in detail.

Alternatively, the following system configuration may also be applicable. For a specific class of telephone set, measurement is made on acoustic characteristics, such as loudness rating values, including frequency characteristics obtained from the subscriber line interface unit 23 on the earphone 25 of the telephone set 20 or frequency characteristics obtained from the microphone 21 toward the subscriber line interface unit 23 of the telephone set 20, for example. It should be noted that a telephone set having contents of the change command different from another telephone set is classified into a different sort, or terminal class, even both of the telephone sets falling in the same kind. The measurement is carried out by for example a quality measurement functional unit. Based on the measured values, converting data for converting in-channel signals so as to comply with the characteristics of a telephone set or, e.g. a converting command on conversion software, such as a signal processing program, are registered on the server 6 on the IP network 4. The conversion software may be implemented in the form of, e.g. five program patterns arranged on a menu.

The gateway unit 3A acquires the converting data or the conversion software on the basis of information for determination, such as measured values, obtained by the subscriber line circuit 14. The conversion software is applied to for example a measured value to obtain converting data. The so-obtained converting data, i.e. the converting command, are imparted to the telephone set 20 to cause the telephone set 20 to change the properties of the in-channel signals.

Similar methods may be applied to changing the characteristics of the in-channel or other signals on the gateway unit 3A. For example, in an application of the IP network, a change of the characteristics of the in-channel signals of the telephone set 20 or the gateway unit 3A may make flat the frequency characteristics over the entire band permitted by the IP network.

In the above-described embodiment, the gateway unit 3A is configured for variably setting various characteristics solely depending on the class of the telephone set 2A connected to itself. Alternatively, the system may be adapted so that information on the class of the counterpart or called telephone set 2B may be taken in from the counterpart gateway unit 3B or telephone set 2B, by e.g. negotiation, such that various characteristics are variably set, based on the classes of the two telephone sets thus obtained. For example, various characteristics may be variably set based on the class of one of the telephone sets which has its communication quality expected worse.

The above-described embodiment is directed to a gateway unit to which the present invention is applied. However, the present invention is not limited to such a gateway unit, but may be effectively applied to dedicated devices by which e.g. a general subscriber telephone set is connected to the IP network or the telephone set such as a broadband telephone terminal is connected to a public switched telephone network.

The gateway unit 3A is not limited to one physically separated from the telephone set 2A. For example, the gateway unit 3A may be of the type attachable to the telephone set 2A as an additional element or built in at the time of manufacture. For example, the gateway unit 3A may be adapted to incorporate therein circuitry corresponding to that of the telephone subscriber set 2A.

FIG. 13 exemplarily shows an integrated broadband telephone set 400 including a telephone circuit 402 interconnected to the line 61, which is connected to a line circuit 404 partially corresponding to the subscriber line circuit 14 included in the gateway unit 3A shown in FIG. 1. More specifically, the integrated telephone subscriber set 400 integrally has the functions of telephone subscriber set 2A and the gateway unit 3A of the embodiment shown in FIG. 1. Those functioning elements are enclosed with a housing, which is symbolically designated with the same reference numeral 400 as the integrated telephone set. In the figure, like elements are designated with the same reference numerals, and redundant description will be avoided for simplicity.

The telephone circuit 402 may be adapted to include circuits corresponding to the transmitter 22, the receiver 24 and part of the controller 26, functioning similarly to the broadband telephone subscriber set 20, FIG. 2. More specifically, the telephone circuit 402 is adapted for setting up, i.e. originating and/or receiving, a call selectively over either the IP network 4 or the public switched telephone network 5. The telephone circuit 402 has its handset 406 connected which includes a microphone and an earphone, not shown, corresponding to the microphone 21 and the earphone 25, respectively. The line circuit 404 and the telephone circuit 402 may be implemented by digital circuit components. The integrated telephone subscriber set 400 is advantageously applicable to a broadband call exclusively established over the IP network 4, or to a call selectively established over the IP network 4 or the public switched telephone network 5.

The illustrative embodiment thus accomplishes high-quality communications with broadband voice transmission. Moreover, the embodiment applies a system accommodating the broadband communications with voice transmission appropriately established over the public switched telephone network.

Well, in general, certain kinds of gateway units coping with VoIP architecture are capable of accommodating both a general subscriber telephone set for use in a public switched telephone network and a broadband telephone set, while other kinds of gateway units, also coping with VoIP architecture, may accommodate plural telephone sets, such as general subscriber telephone sets and broadband telephone sets. Such kinds of gateway units are adapted to determine whether to use the IP network or the public switched telephone network, depending on the class of the telephone set held by itself or a counterpart telephone set, to perform the processing in keeping with the so-determined network.

For example, when the general subscriber telephone set accommodated in the gateway unit is to be connected to the IP network, the frequency characteristics of the speech signal to be transmitted from the general subscriber telephone set are corrected to send out high-quality speech signals to the IP network. Conversely, when the broadband telephone set accommodated is to be connected to the IP network, the broadband speech signals to be transmitted are supplied from the broadband telephone set, so that the above-mentioned correction function for the frequency characteristics of the speech signals to be transmitted is unneeded. In the latter case, correction would rather deteriorate the speech quality. Thus, it is advantageous to provide the gateway unit with the function of determining the class of a telephone set interconnected thereto.

Figure 3:
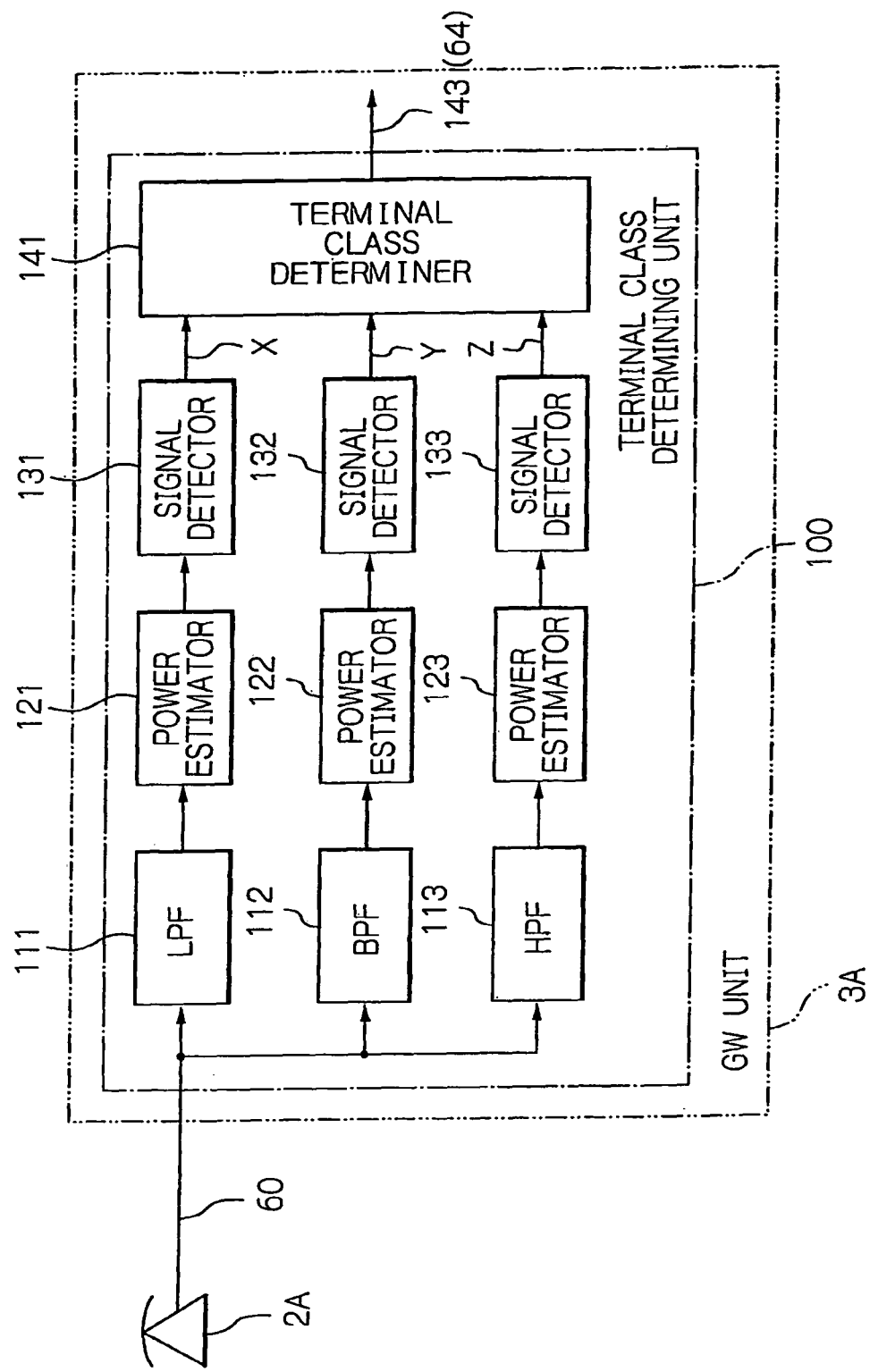
FIG. 3 is a schematic block diagram showing an illustrative embodiment of a terminal class determining unit applicable to the embodiment shown in FIG. 1.

For this reason, the gateway unit 3A, as typical of a telephone set accommodating device, may include a terminal class determining unit for determining the sort, or terminal class, of the telephone set 2A, as briefly pointed out earlier. In FIG. 3, there is shown an illustrative embodiment of a terminal class determining unit 100 provided to the gateway unit 3A. This terminal class determining unit 100 may be provided to, for example, the subscriber line circuit 14 of the gateway unit 3A. The gateway unit is merely illustrative, and the device to which the present invention is applied is not limited to a gateway unit, but may be applied to a variety of devices that are in need of the determination of the class of a telephone subscriber set interconnected thereto.

The terminal class determining unit 100 of the embodiment has the function of determining which of a general subscriber telephone set having its band not higher than 3.4 kHz, a broadband telephone set having its band not higher than 70 kHz and an audio band telephone set having its band less than 20 kHz is interconnected as the telephone set 2A to the gateway unit. To this end, the terminal class determining unit 100 includes band separating filters 111, 112 and 113, power estimators 121, 122 and 123, signal detectors 131, 132 and 133 and a terminal class determiner 141, interconnected as shown. These components may be implemented by analog or digital circuitry.

The three band separating filters 111 to 113 are connected to the line 60 coming from the telephone set 2A to separate the frequency band of the signals. The band separating filter 111 is a low-pass filter (LPF), passing the signal components not higher than 3.4 kHz, as shown in FIG. 4A, while the band separating filter 112 is a band-pass filter (BPF), passing the signal components ranging from 3.4 to 70 kHz, as shown in FIG. 4B, and the band separating filter 113 is a high-pass filter (HPF), passing the signal components not less than 70 kHz, as shown in FIG. 4C.

The power estimators 121 to 123 are adapted for calculating the power for the respective, separated bands, or sub-bands, of signals. The power estimators 121 to 123 calculate the power at a predetermined time interval, for example, 10 ms.

The signal detectors 131 to 133 are adapted to detect whether or not components falling in the sub-bands separated by the filters 111 to 113 are contained in the signals coming from the telephone set 2A. The signal detectors 131 to 133 are adapted to smooth the output power from the power estimators 121 to 123, respectively, to compare the so-smoothed output power to respective threshold values to develop results X, Y and Z on the outputs thereof, respectively. Each of the results from the detection X, Y and Z contains either of logical "1" and "0" in such a fashion that when the smoothed power exceeds a threshold value a logical "1" is output, indicating the presence of the signal component of the band in question, whereas when the smoothed power does not exceed the threshold value a logical "0" is output, indicating the absence of the signal component of the band in question.

The terminal class determiner 141 is adapted to determine the class, i.e. terminal class, of the telephone set 2A interconnected thereto on the basis of the results of detection X, Y and Z for the respective bands presented by the signal detectors 131 to 133. The terminal class determiner 141 gives a decision in accordance with the truth table, shown as an example in FIG. 5, and outputs the so-produced results of decision as terminal class information 143. The terminal class information 143 from the terminal class determiner 141 is imparted to processing circuitry, such as the control and VoIP processor 16, in the gateway unit 3A, which adaptively changes its processing depending on the class of the telephone set 2A. In an application in which the terminal class determining unit 100 is provided within the subscriber line circuit 14, the terminal class information 143 forms a portion of the aforementioned signal 64.

In a case where the telephone set 2A, interconnected to the gateway unit 3A, is a general subscriber telephone set, the signal band transmitted over the line 60 is 3.4 kHz or less, so that the results of detection X, Y and Z for the respective bands by the signal detectors 131 to 133 respectively take the logical values 1, 0 and 0, which will be represented by [100]. Responsive to this detection result, the terminal class determiner 141 determines the interconnected telephone set 2A to be a general subscriber telephone set.

In a case in which the telephone set 2A, interconnected to the gateway unit 3A, is a broadband telephone set, the band is 7.0 kHz or less. Thus, the results of detection X, Y and Z developed from the signal detectors 131 to 133 are [110]. As a consequence, the terminal class determiner 141 determines the interconnected telephone set 2A to be a broadband telephone set. Further, where the telephone set 2A accommodated is an audio band telephone set, the band is 20 kHz or less. In that case, the results of detection X, Y and Z by the signal detectors 131 to 133 are [111], so that the interconnected telephone set 2A is determined as an audio band telephone set by the terminal class determiner 141. Meanwhile, when the results of detection X, Y and Z is [101], it indicates the highest band component contained, so that the accommodated telephone set 2A is presumed to be an audio band telephone set.

It is logically not probable that the results of detection X, Y and Z are [000], [001], [010] or [011]. If this should be the case, however, the telephone set 2A accommodated is presumed with the instant embodiment to be a general subscriber telephone set.

The signal 60 available from the telephone set 2A, for use in the terminal class determination, is not restricted to the speech signal transmitted, but may be a signal available during a call connecting sequence prior to a call-connected state established. Alternatively, the signal usable for the terminal class determination may be a noise, such as a background noise, output by the telephone set 2A. Even with a noise, when influenced by e.g. the band limitation proper to the telephone set 2A, it is possible to give the above-described determination of the terminal class.

Among the methods of determining the class of telephone sets, such a method may be contemplated in which a key included in a telephone set or a gateway unit is manipulated to enter and set the class of the telephone set in the gateway unit. However, since telephone sets or a gateway units are provided essentially with a small number of keys and the method mentioned above utilizes any of such a small number of keys in order to set the terminal class, the operating sequence is likely to be complex. That may render the method poor in maneuverability for a non-professional, general user to practice, thus failing to properly set a gateway unit in question.

As other methods of determining the class of the telephone set, such methods may be used in which a dip switch is manipulated for setting the terminal class, and the mechanical shape of a connector for connecting a telephone set is discriminated, as describe earlier. It is, however, difficult to evade the risk of erroneously setting the dip switch or connecting the connector.

However, with the above-described embodiment, the class of the telephone set is determined on the basis of the difference in effective band with the different types of the telephone sets, so that it is possible to give a correct decision of the terminal class, i.e. the class of telephone set accommodated. Moreover, since the determination is automatic, there is no fear of erroneous setting ascribable to the manual operations by a user.

Figure 6:
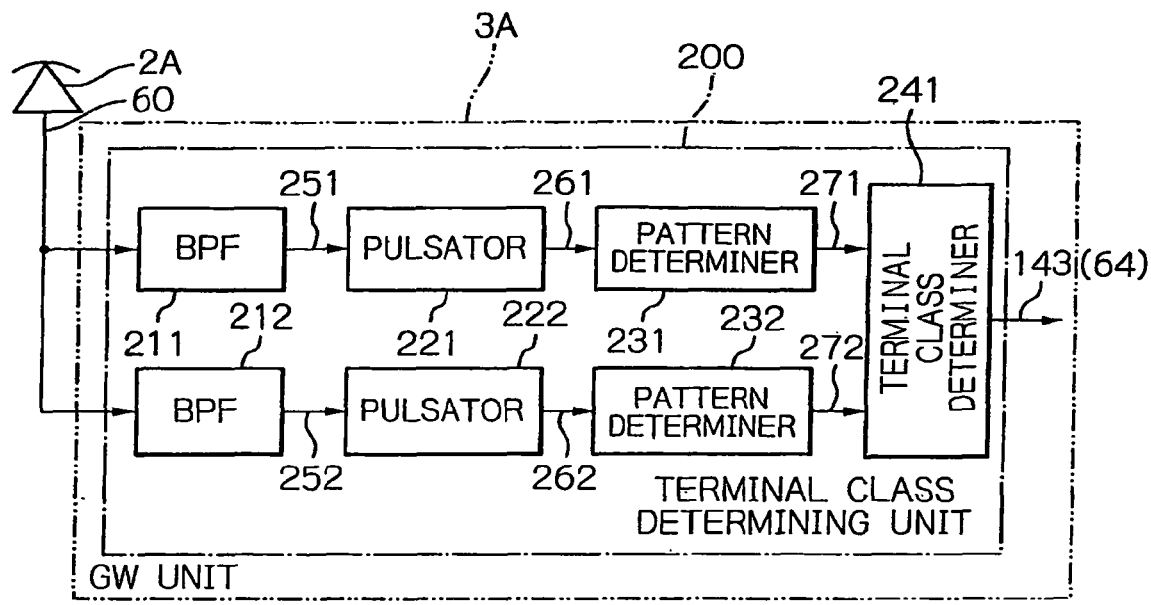
FIG. 6 is a schematic block diagram, similar to FIG. 3, showing a terminal class determining unit of an alternative embodiment of the invention.

FIG. 6 shows an alternative embodiment of a terminal class determining unit 200 according to the present invention. This embodiment is also adapted to determine which of a general subscriber telephone set, a broadband telephone set and a audio band telephone set is interconnected to the gateway unit. The terminal class determining unit 200 includes a pair of filters 211 and 212, a pair of pulsator circuits 221 and 222, a pair of pattern determiners 231 and 232, and a terminal class determiner 241, interconnected as depicted.

The filter 211 is a band-pass filter (BPF) for passing a predetermined frequency component of, e.g. only 6 kHz, while the other filter 212 is a band-pass filter for passing another predetermined frequency component of, e.g. only 12 kHz.

In the present embodiment, a broadband telephone set interconnected as the terminal 2A sends out signals of a predetermined frequency, e.g. 6 kHz, for the period of 200 msec, and interrupts the frequency for the period of 200 msec, to repeat this sequence a predetermined number of times, as shown in FIG. 8A. The illustrative embodiment is applicable to determining three classes of telephone sets interconnected. The present invention is, of course, not restricted to this specific embodiment but may be applicable to determining two or more than three telephone sets accommodated.

The pulsator circuits 221 and 222 are signal conversion circuits for converting the output signals 251 and 253 from the filters 211 and 212 into pulse signals 261 and 262, respectively. The pulsator circuits 221 and 222 are adapted, for example, to acquire the envelope of the input signals and compare the envelope to a threshold level for converting the input signal to signal pulses 261 and 262, respectively.

The pattern determiners 231 and 232 are adapted for verifying whether or not output signals 261 and 262 of the respective pulsator circuits 221 and 222 are of a predetermined pattern as shown in FIG. 8C, respectively. When each of the pattern determiners 231 and 232 detects the predetermined pattern satisfied by the signal output from the associated pulsator, it outputs a logical "1" on the associated output 271 or 272, whereas when it fails in detecting the predetermined pattern satisfied, it outputs a logical "0" on the associated output 271 or 272.

The terminal class determiner 241 is adapted to be responsive to the resultant signals of decision 271 and 272 supplied from the pattern determiners 231 and 232 to determine the class of the telephone set 2A accommodated. The terminal class determiner 241 deciphers a combination of outputs 271 and 272 from the pair of pattern determiners 231 and 232, at a predetermined decision timing, and determines, when the combination is [00], [10] and [01], the telephone set to be a general subscriber telephone set, a broadband telephone set or an audio band telephone set, respectively.

With the illustrative embodiment, the terminal class or the type of telephone set is determined when an off-hook of the telephone set 2A interconnected is sensed. However, the decision timing is not to be restricted to the off-hook timing but may be optional at any appropriate timing. Moreover, in connection with the decision timing, the operation has been described on the case where a call originates from the accommodated telephone set 2A. Alternatively, the present invention may be also advantageously applicable to the system in which a gateway unit on a called party, i.e. 3B, FIG. 1, with the illustrative embodiment, is configured for determining the type of the telephone set 2B interconnected thereto. As may be understood from this, the decision timing of the terminal class by means of sensing off-hook may be applied to either of the calling and called sides.

Figure 7:
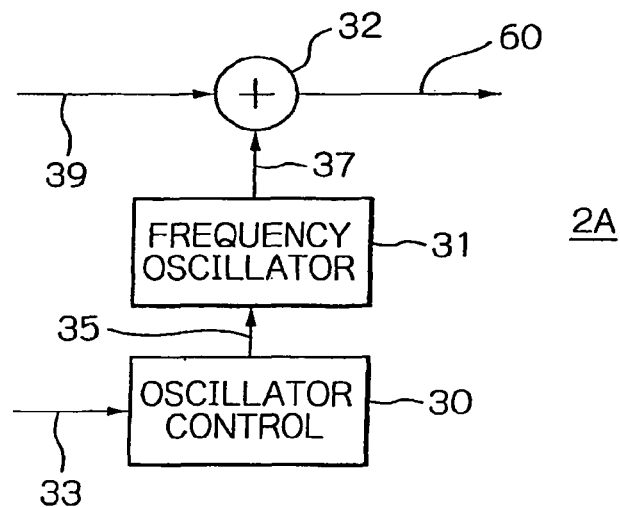
FIG. 7 is a functional block diagram showing the essential portion of a telephone set of another alternative embodiment of the invention.

Well, FIG. 7 shows a portion of another alternative embodiment of the telephone set 2A which is pertinent to the invention. In this figure, the telephone set 2A is a broadband or an audio band telephone set, and includes an oscillator control 30, a frequency oscillator 31 and an adder 32 interconnected as illustrated.

The oscillator control 30 is a control circuit which is adapted to be responsive to an off-hook detection signal 33 received and supply the frequency oscillator 31 with an oscillator control signal 35, which has its timing relationship similar to that of the signal 261 or 262 shown in FIG. 8C. The off-hook detection signal 33 is supplied from an off-hook detection sensor, not shown, which senses an off-hook of the telephone set 2A.

The frequency oscillator 31 is adapted to oscillate and output a predetermined frequency 37 during the period of logical "1" of the oscillator control signal 35 from the oscillator control 30 and interrupt the frequency during the period of logical "0" of the oscillator control signal 35 from the oscillator control 30. In the present embodiment, the frequency oscillator 31 oscillates the frequencies of 6 kHz- and 12 kHz when the own telephone set 2A is a broadband and an audio band telephone set, respectively.

The adder 32 is a signal modulator adapted for applying the oscillator output 37 from the frequency oscillator 31 to the path 60 to the gateway unit 3A including the own telephone set 2A. The adder 32 has another input interconnected to, e.g. a transmission line coming from a speech signal transmitter similar to the microphone 21, FIG. 2.

When the telephone set 2A accommodated in the gateway unit 3A is a general subscriber telephone set, the oscillator 31 is controlled in such a fashion that intermittent or repetitive burst oscillations at the predetermined frequency and the predetermined time interval are not generated even on an off-hook sensed on the telephone set 2A. As a result, the pattern determiners 231 and 232 produce a logical set of values [10] on the outputs thereof, the terminal class determiner 241 in turn determining the accommodated telephone set 2A to be a broadband telephone set.

If the telephone set 2A accommodated in the gateway unit 3A is a broadband telephone set, an off-hook sensed on the telephone set 2A causes the oscillator 31 to be controlled to generate intermittent burst oscillations at the predetermined frequency of 6 kHz with the illustrative embodiment. Resultantly, the pattern determiners 231 and 232 develop a set of binary values [10] on the outputs thereof, so that the terminal class determiner 241 determines the telephone set 2A interconnected to be a broadband telephone set.

When the interconnected telephone set 2A is an audio band telephone set, an off-hook of the telephone set 2A causes intermittent burst oscillations at a frequency of 12 kHz with the present embodiment. As a result, the pattern determiners 231 and 232 develop a set of binary values [01] on the outputs thereof. In turn, the terminal class determiner 241 determines the interconnected telephone set 2A to be an audio band telephone set.

In the present embodiment, a particular class of telephone set is adapted for generating intermittent burst oscillations at the frequency specifically predetermined thereto, and the gateway unit accommodating the telephone set is adapted to determine the class of the accommodated telephone set 2A based on whether or not it has received the intermittent burst oscillation signals specific thereto. In this manner, the class of telephone set 2A accommodated may correctly be determined. In addition, since the decision is made automatic, there is no fear of erroneous setting on the side of the user.

In the present embodiment, the predetermined frequency is selected in relation to the effective band of the telephone set in question. From this perspective also, the class of the accommodated telephone set 2A may be determined correctly.

In the instant embodiment, the frequency oscillator 31 may be configured for operating as follows. If the telephone set 2A is a broadband telephone set, a signal of a predetermined frequency, e.g. 6 kHz, is transmitted, for example, for the period of 200 msec and interrupted for the period of 200 msec with this sequence repeated a predetermined number of times, as shown in FIG. 9A. If the telephone set 2A is an audio band telephone set, the signal 35 of the predetermined frequency is transmitted for the period of 300 msec and interrupted for the period of 100 msec, with this sequence repeated a predetermined number of times, as shown in FIG. 9C.

The resulting signals are converted by the frequency oscillator 31 into pulse signals 37 such that logical signals are produced which are represented by a combination of the logical "1" and "0", of which the duration is different between the broadband and audio band telephone sets, as shown in FIGS. 9B and 9D, respectively. In this manner, the terminal class determiner 241 is able to determine whether or not the accommodated telephone set is a broadband or a audio band telephone set. Whenever the pulse signals shown in FIGS. 9B and 9D cannot be obtained, the terminal class determiner 241 determines that the accommodated telephone set 2A is a general subscriber telephone set.

This embodiment is applied to the broadband and audio band telephone sets in which the repetitive pattern is the same as each other with the oscillation frequency different from each other, as shown in FIGS. 8A, 8B and 8C, or the oscillation frequency is the same as each other with the repetitive pattern different from each other, as shown in FIGS. 9A to 9D. According to the present invention, these may be combined together. For example, both the repetitive pattern and the oscillation frequency may differ between the two classes of telephone set. The general subscriber telephone set may be adapted to intermittently generate and transmit the oscillation frequency signals. The two or more frequencies may be output by a sole telephone set. Such signals are not limited to stable sinusoidal waves but may be modulated to some extent.

Figure 10:
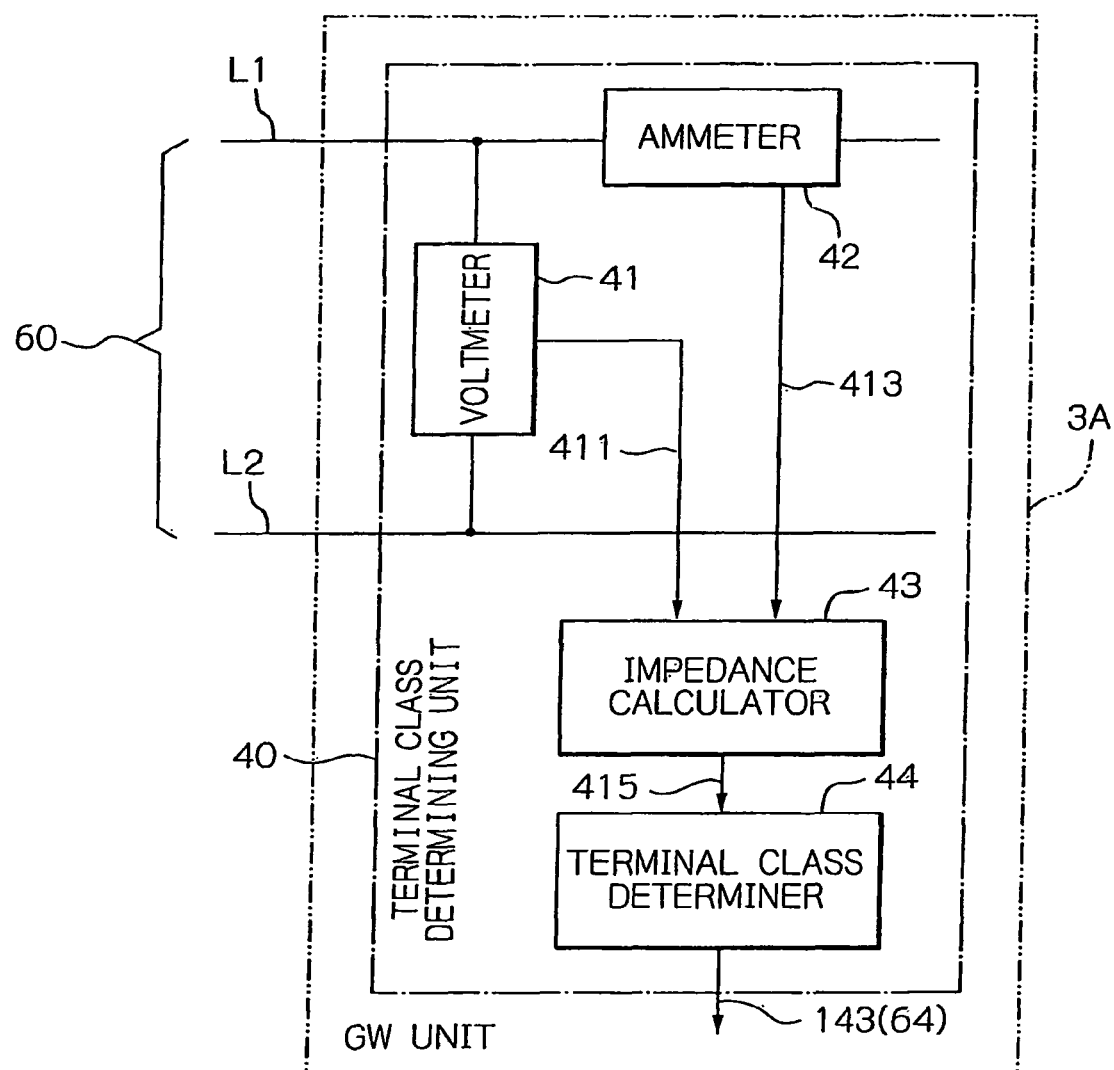
FIG. 10 is a schematic block diagram exemplarily showing a terminal class determining unit of a further alternative embodiment of the invention.

Referring now to FIG. 10, a further alternative embodiment of the terminal class determining unit in the gateway unit 3A will be described. A terminal class determining unit 40 of the present embodiment is also adapted to determine which of a general subscriber telephone set, a broadband telephone set or an audio band telephone set is accommodated in the gateway unit 3A. The terminal class determining unit 40 includes a voltmeter 41, an ammeter 42, an impedance calculator 43 and a terminal class determiner 44, interconnected as shown.

The voltmeter 41 is adapted for measuring the voltage across a pair of lines L1 and L2 connected to the accommodated telephone set 2A and outputs the measured voltage value 411 to the impedance calculator 43. The ammeter 42 is adapted for measuring the blocking current which flows through a loop formed by the lines L1 and L2. The ammeter 42 outputs the measured current value 413 in the form of digital value to the impedance calculator 43.

The impedance calculator 43 is adapted for receiving measured results 411 and 413 from the voltmeter 41 and the ammeter 42, respectively, to calculate the impedance seen from the gateway unit 3A toward the accommodated telephone set 2A. The impedance calculator 43 develops a signal 415 representing the impedance thus calculated.

The terminal class determiner 44 is adapted to determine the class of the accommodated telephone set 2A based on the signal 415 from the calculator 43. With the embodiment, when the impedance is equal or close to 600, 300 or 900Ω, the terminal class determiner 44 determines the telephone set in question to be a general subscriber telephone set, a broadband telephone set or an audio band telephone set, respectively, and outputs the results from determination on its output 143. The terminal class determiner 44 gives this decision upon an off-hook made on the accommodated telephone set 2A.

Figure 11:
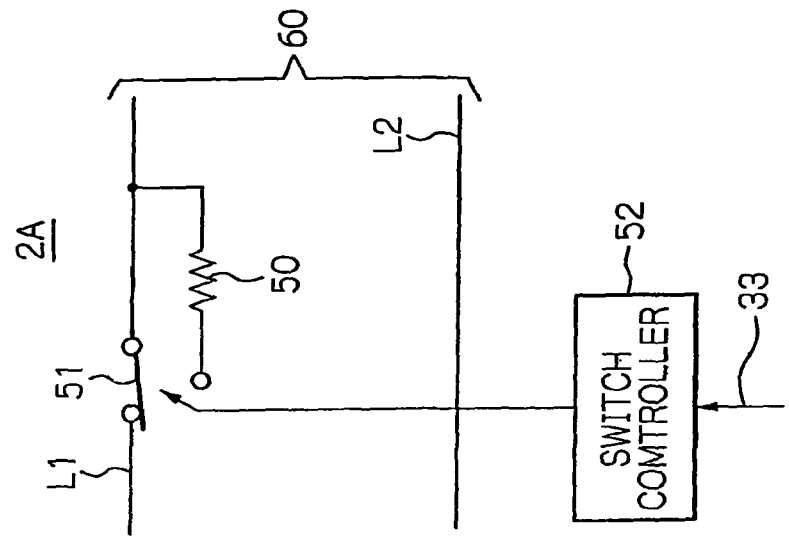
FIGS. 11 and 12 are schematic block diagrams exemplarily showing the essential portion of a telephone set of still further alternative embodiments.
Figure 12:
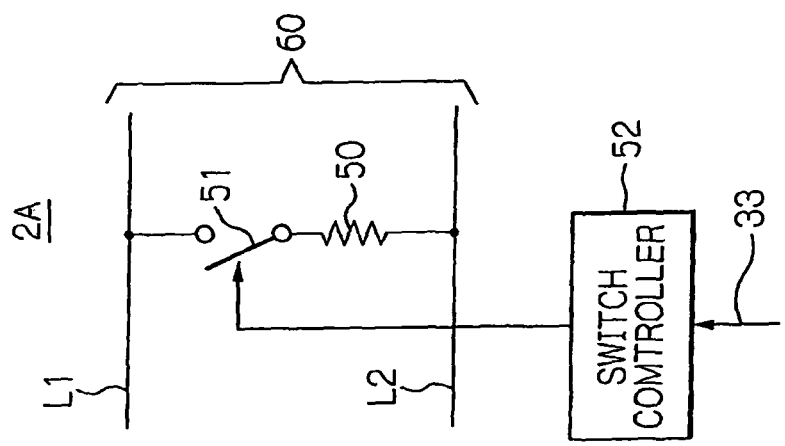

In an application in which a broadband or an audio band telephone set, connected as the telephone set 2A, is of such a type that does not exhibit the above-described impedance value at the time of off-hook, such a broadband or audio band telephone set may be adapted to have such a circuit as shown in FIG. 11 or 12, respectively, coupled across the pair of lines L1 and L2 thereof. In the embodiments which will be described, such a broadband or an audio band telephone set 2A includes a resistor 50, a switch 51 and a switch controller 52, interconnected as shown in FIGS. 11 and 12.

When a broadband telephone set is in use as the telephone set 2A, the telephone set 2A comprises the circuit shown in FIG. 11 in which the resistor 50 and the switch 51 serially connected are connected across the pair of lines L1 and L2 connected to the associated gateway unit 3A. The resistor 50 of the broadband telephone set 2A has its resistor value which is selected so that, on closure of the switch 51, the impedance of the telephone set 2A seen from the gateway unit 3A is equal or close to 300Ω in the present embodiment.

When the telephone set 2A in use is an audio band telephone set, the telephone set 2A comprises the circuit shown in FIG. 12 in which the resistor 50 and the switch 51 are connected such that the resistor 50 has its one terminal connected with one of the lines L1 and L2, for example, line L1, and the switch 51 is connected in series with the one line L1 so as to render the connection of the resistor 50 controllable. The resistor 50 of the audio band telephone set has its resistance value which is selected so that, on closure of the switch 51, the impedance of the telephone set 2A seen from the gateway unit 3A is equal or close to 900Ω in the present embodiment.

The switch controller 52 is adapted for responding to the aforementioned off-hook detection signal 33 supplied from an off-hook detection sensor to closing the switch 51 in a predetermined time period.

In operation, when the telephone set 2A accommodated in the gateway unit 3A is a general subscriber telephone set, an off-hook of the telephone set 2A does not cause the aforementioned change of the impedance thereof so that the output 415 of the impedance calculator 43 is substantially equal or close to 600Ω. The terminal class determiner 44 of the gateway unit 3A then determines the accommodated telephone set 2A to be a general subscriber telephone set.

When the accommodated telephone set 2A is the broadband telephone set including the circuit shown in FIG. 11, an off-hook of the telephone set 2A leads to a closure of the switch 51, as a result of which the output 415 of the impedance calculator 43 of the gateway unit 3A indicates the value substantially equal or close to 300Ω. The terminal class determiner 44 then determines the accommodated telephone set 2A to be a broadband telephone set.

When the accommodated telephone set 2A is the audio band telephone set having the circuit shown in FIG. 12, the output 415 of the impedance calculator 43 is substantially equal or close to 900Ω. The terminal class determiner 44 then determines the accommodated telephone set 2A to be an audio band telephone set.

In an application where a general subscriber telephone set, a broadband telephone set and a audio band telephone set are designed to have the impedance values thereof different from one another, it is unnecessary to provide the circuits shown in FIGS. 11 and 12.

The instant embodiments are based on the concept that the impedance looking towards the accommodated telephone set 2A is utilized to determine the class of the accommodated telephone set 2A. It is thus possible to accurately determine the class of an accommodated telephone set. Moreover, the terminal class or kind of a telephone set is automatically determined to the extent that the risk of erroneously setting is minimized on the part of the user.

The above-described embodiments are adapted to operate the impedance for a broadband and an audio band telephone set. However, a general subscriber telephone set may be adapted to operate its impedance. Alternatively, the system may be adapted for utilizing the interline voltage across, or the blocking current flowing through, the subscriber loop of a telephone subscriber set accommodated to determine the class of the accommodated telephone set.

With the above-described embodiments of the present invention, the sort, or terminal class, of a telephone set, accommodated in a telephone set or subscriber terminal accommodating unit, such as a gateway unit, may be determined correctly. The present invention is advantageously applicable to a system configuration in which, for example, a telephone subscriber set or terminal is able to communicate selectively with the IP network or with the public switched telephone network.

The entire disclosure of Japanese patent application Nos. 2002-377165 and 2003-52957 filed on Dec. 26, 2002 and Feb. 28, 2003, respectively, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

The invention claimed is:

1. A voice communications apparatus selectively connectable to a general subscriber telephone set and a broadband telephone set, said apparatus being interposed in communication between the connected telephone set and a public switched telephone network, said apparatus comprising:
    a circuit for determining a class of the connected telephone set; and
    a circuit for changing at least a sampling frequency in sampling an analog signal from the connected telephone set, depending on the determined class of the connected telephone set.

2. A voice communications apparatus comprising:
    a telephone circuit for setting up a call selectively over one of a broadband network and a public switched telephone network;
    a first circuit for determining over which of the broadband network and the public switched telephone network a call is to be established; and
    a second circuit for changing at least a sampling frequency in sampling an analog signal from said telephone circuit, depending on a determination made by said first circuit.

3. A telephone set connectable to a network selected from the group consisting of a public switched telephone network and a broadband communications network, said telephone set comprising:
    a determining circuit for receiving from the network a signal and determining whether the network is the public switched telephone network or the broadband communications network based on the signal; and
    a band limiter, responsive to said determining circuit having determined that the network is the public switched telephone network, for limiting a communication band of the signal transmitted at least toward the public switched telephone network to an acceptable band of the public switched telephone network.

4. The telephone set according to claim 3, wherein the signal has a frequency band different between the public switched telephone network and the broadband communications network.

5. The telephone set according to claim 3, wherein said band limiter comprises:
    a filter for limiting the communication band of the signal transmitted at least toward the public switched telephone network to the acceptable band; and
    a selector, operative in response to said determining circuit having determined that the network is the public switched telephone network, for connecting the signal to said filter.

6. A voice communications system comprising:
    a particular telephone set selected from the group consisting of a general subscriber telephone set and a broadband telephone set, and
    a voice communications apparatus interposed in communication between said particular telephone set and at least one of a public switched telephone network and a broadband communications network,
    wherein said voice communications apparatus includes a circuit for sending out to said telephone set a signal by which what sort of network a particular one of the at least one networks is can be determined, and
    wherein said particular telephone set includes a determining circuit for receiving the sent-out signal and for determining which of the public switched telephone network and the broadband communications network the particular network is, based on the received signal; and
    wherein said particular telephone set additionally includes a band limiter, responsive to said determining circuit having determined that the particular network is the public switched telephone network, for limiting a communication band of the signal transmitted at least toward the public switched telephone network to an acceptable band of the public switched telephone network.

7. The system according to claim 6, wherein said band limiter comprises:
    a filter for limiting the communication band of the signal transmitted at least toward the public switched telephone network to the acceptable band; and
    a selector, operative in response to said determining circuit having determined that the network is the public switched telephone network, for conveying the signal to said filter.

8. A voice communications system comprising:
    a particular telephone set selected from the group consisting of a general subscriber telephone set and a broadband telephone set, and
    a voice communications apparatus interposed in communication between said particular telephone set and at least one of a public switched telephone network and a broadband communications network, wherein said voice communications apparatus includes:
a first circuit for determining a class of said particular telephone set; and
a second circuit, operative in response to the class determined, for changing a property of an in-channel signal transmitted between said particular telephone set and said voice communications apparatus.

9. The system according to claim 8, wherein said first circuit uses a signal available from said particular telephone set or a characteristic value managed by said particular telephone set to determine the class of said particular telephone set.

10. The system according to claim 8, wherein said first circuit sends out a signal to said particular telephone set or changes a characteristic value of a connection line connected to said particular telephone set to use a response signal, or a change in the response signal, received from said particular telephone set to determine the class of said particular telephone set.

11. The system according to claim 8, further comprising a third circuit for obtaining information on a class of another telephone set as a counterpart of said particular telephone set through the public switched telephone network or the broadband communications network,
wherein said second circuit is responsive to the determined class and the information obtained by said third circuit to change the property of the in-channel signal.

12. A voice communications system comprising:
a particular telephone set selected from the group consisting of a general subscriber telephone set and a broadband telephone set; and
a voice communications apparatus interconnected to said particular telephone set and interposed in communication between said particular telephone set and at least one of a public switched telephone network and a broadband communications network,
wherein said voice communications apparatus includes:
a first circuit for determining a class of said particular telephone set; and
a second circuit for providing said particular telephone set with a change command for changing characteristics corresponding to the class determined, and
wherein said particular telephone set includes a third circuit responsive to the change command for changing a property of an in-channel signal transmitted between said voice communications apparatus and said particular telephone set.

13. The system according to claim 12, wherein said first circuit determines the class of said particular telephone set based on a signal from said particular telephone set or a characteristic value managed by said particular telephone set.

14. The system according to claim 13, further comprising a fourth circuit for obtaining information on a class of another telephone set as a counterpart of said particular telephone set through the public switched telephone network or the broadband communications network;
wherein said third circuit is responsive to the determined class and the information obtained by said fourth circuit to change the property of the in-channel signal.

15. A telephone set connectable to a particular network selected from the group consisting of a public switched telephone network and a broadband communications network, said telephone set comprising:
a determining circuit for determining, from a first signal by which what sort of network that the particular network is can be determined, whether the particular network is the public switched telephone network or the broadband communications network; and
a band limiter, responsive to said determining circuit having determined that the particular network is the public switched telephone network, for limiting a communication band of a second signal transmitted at least toward the public switched telephone network to an acceptable band of the public switched telephone network.

16. The telephone set according to claim 15, wherein the second signal has a frequency band different from the public switched telephone network and the broadband communications network.

17. The telephone set according to claim 15, wherein said band limiter comprises:
a filter for limiting the communication band of the signal transmitted at least toward the public switched telephone network to the acceptable band; and
a selector, operative in response to said determining circuit having determined that the particular network is the public switched telephone network, for conveying the signal to said filter.

18. The telephone set according to claim 15, wherein the first signal is received from the network.

19. The telephone set according to claim 15, wherein the first signal is generated by said telephone set.

20. The telephone set according to claim 19, wherein the first signal is a signal designating a called party.

21. A voice communications system comprising:
a particular telephone set selected from the group consisting of a general subscriber telephone set and a broadband telephone set; and
a voice communications apparatus interposed in communication between said particular telephone set and at least one of a public switched telephone network and a broadband communications network,
wherein said voice communications apparatus includes a circuit for sending out to said particular telephone set a first signal,
wherein said particular telephone set includes:
a determining circuit for receiving the first signal and determining which of the public switched telephone network and the broadband communications network the particular telephone set is connected to, based on the received first signal; and
a band limiter, responsive to said determining circuit having determined that the network to which the particular telephone set is connected is the public switched telephone network, for limiting a communication band of a second signal transmitted at least toward the public switched telephone network to an acceptable band of the public switched telephone network.

22. The system according to claim 21, wherein the second signal has a frequency band different from the public switched telephone network and the broadband communications network.

23. The system according to claim 21, wherein said band limiter comprises:
a filter for limiting the communication band of the second signal transmitted to the acceptable band; and
a selector, operative in response to said determining circuit having determined that the network to which the particular telephone set is connected is the public switched telephone network, for conveying the second signal to said filter.

* * * * *